(12) United States Patent
Liu

(10) Patent No.: US 12,313,874 B1
(45) Date of Patent: May 27, 2025

(54) LIGHT SCULPTURE ELECTRONIC CARD

(71) Applicant: BEAUTIFUL CARD CORPORATION, Taoyuan (TW)

(72) Inventor: Jen-Hsiang Liu, Taoyuan (TW)

(73) Assignee: BEAUTIFUL CARD CORPORATION, Taoyuan (TW)

( * ) Notice: Subject to any disclaimer, the term of this patent is extended or adjusted under 35 U.S.C. 154(b) by 0 days.

(21) Appl. No.: 18/600,003

(22) Filed: Mar. 8, 2024

(30) Foreign Application Priority Data

Nov. 23, 2023 (TW) .................................. 112145308

(51) Int. Cl.
*G06K 19/07* (2006.01)
*F21V 8/00* (2006.01)
*G06K 19/077* (2006.01)

(52) U.S. Cl.
CPC ......... *G02B 6/0045* (2013.01); *G02B 6/0041* (2013.01); *G06K 19/07707* (2013.01)

(58) Field of Classification Search
CPC ................ G02B 6/0045; G02B 6/0041; G06K 19/07707

USPC ......................................................... 235/492
See application file for complete search history.

(56) References Cited

U.S. PATENT DOCUMENTS

| | | | |
|---|---|---|---|
| 2009/0241387 A1* | 10/2009 | Wong | B42D 15/022 40/455 |
| 2020/0183077 A1* | 6/2020 | Chu | G02B 6/0055 |
| 2023/0177302 A1* | 6/2023 | Liu | G06K 19/0723 235/380 |
| 2023/0409859 A1* | 12/2023 | Liu | G06K 19/07705 |

\* cited by examiner

*Primary Examiner* — Daniel A Hess
(74) *Attorney, Agent, or Firm* — Juan Carlos A. Marquez; Marquez IP Law Office, PLLC

(57) ABSTRACT

A light sculpture electronic card includes a card body including at least one light exiting area; a circuit module arranged in the card body and including a circuit carrier board; at least one light emitting element arranged in the card body and coupled to the circuit carrier board; and a light guiding plate arranged in the card body and including at least one light guiding plate body pattern. The light guiding plate body pattern is aligned with the light exiting area. The light guiding plate guides the light emitted by the light emitting element through the light guiding plate body pattern to and out from the light exiting area.

20 Claims, 6 Drawing Sheets

LIGHT SCULPTURE ELECTRONIC CARD

CROSS-REFERENCE TO RELATED INVENTION

This application claims priority from Taiwan Patent Application No. 112145308 filed on Nov. 23, 2023, which are hereby incorporated herein by reference in its entirety.

FIELD OF INVENTION

The present description relates to a light sculpture electronic card.

BACKGROUND

Electronic cards can be applied in financial cards, credit cards, stored-value cards, or membership cards, etc. They are classified into contact-type and contactless-type depending on their usage. While contact-type electronic cards must be in physical contact with external devices, contactless-type electronic cards have to react with external devices by sensing. No matter what type of electronic cards is chosen, there is a need for further visual effects, appearance or decoration.

SUMMARY

Embodiments of the disclosure provide a light sculpture electronic card comprising: a card body comprising at least one light exiting area; a circuit module arranged in the card body and comprising a circuit carrier board; at least one light emitting element arranged in the card body and coupled to the circuit carrier board; and a light guiding plate arranged in the card body and comprising at least one light guiding plate body pattern. The light guiding plate body pattern is aligned with the light exiting area. The light guiding plate guides the light emitted by the light emitting element through the light guiding plate body pattern to and out from the light exiting area.

In some embodiments, the light guiding plate body pattern may comprise a sculpture pattern or a plurality of bubbles. The light guiding plate body pattern may be a pattern presented by the light guiding plate itself, that is, the pattern which is presented by the light guiding plate without additional physical elements attached to the light guiding plate. The sculpture pattern may be located at the surface of the light guiding plate, and may comprise at least one groove. The groove may be covered by a horizontal membrane to form a cavity between the groove and the horizontal membrane. A plurality of bubbles may be located within the light guiding plate. The card body may comprise a first board and a second board. The light exiting area may be located at the first board. The circuit module, the light emitting element and the light guiding plate may be disposed between the first board and the second board. The card body may comprise another light exiting area which is located at the second board and aligned with the light exiting area located at the first board. An ink layer and the light exiting area may be respectively located at two sides of the light guiding plate. The ink layer may be aligned with light guiding plate body pattern, and the ink layer may comprise luminous ink or photosensitive ink. The light exiting area may be an opening or a light transmissive material. The material of the card body may comprise plastic, metal, or a combination thereof. The material of the light guiding plate may comprise PVC, PET, PC, or PMMA. The light guiding plate may have at least one through hole to accommodate the light emitting element, and the light emitting element may be a side view type LED and emits light toward the light guiding plate body pattern. The number of the at least one light emitting element may be four. The light guiding plate may have at least four through holes to respectively accommodate the four light emitting elements. The four light emitting elements may be side view type LEDs and arranged along the edge of the light guiding plate body pattern. The circuit module may comprise a contactless-type RF antenna and/or a contact-type accessing chip. The contactless-type RF antenna may be arranged at the circuit carrier board, and/or the contact-type accessing chip may be arranged at the circuit carrier board. The first board and second board may respectively comprise a first light shielding part and a second light shielding part. The first light shielding part may not shield light exiting area. The circuit module, the light emitting element and the light guiding plate may be disposed between the first light shielding part and the second light shielding part.

As mentioned above, because the light guiding plate is directly provided with the light guiding plate body pattern which is externally visible (e.g. the sculpture pattern or the bubble area), the light emitted by the light emitting element which operates under limited power can be guided by the light guiding plate to present visual effect directly on the light guiding plate, for example, to present a pattern or bubbles etc. on the light guiding plate body pattern of the sculpture pattern or the bubble area, and they are externally visible for the user or other people through the light exiting area. Therefore, light energy can be used more efficiently to present visual effects. It is not necessary to attach an additional pattern element on or above the light guiding plate, but the electronic card still can present visual effects such as a pattern or bubbles. When the electronic card is accessing data or exchanging transaction data, it can also have the function of prompting.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
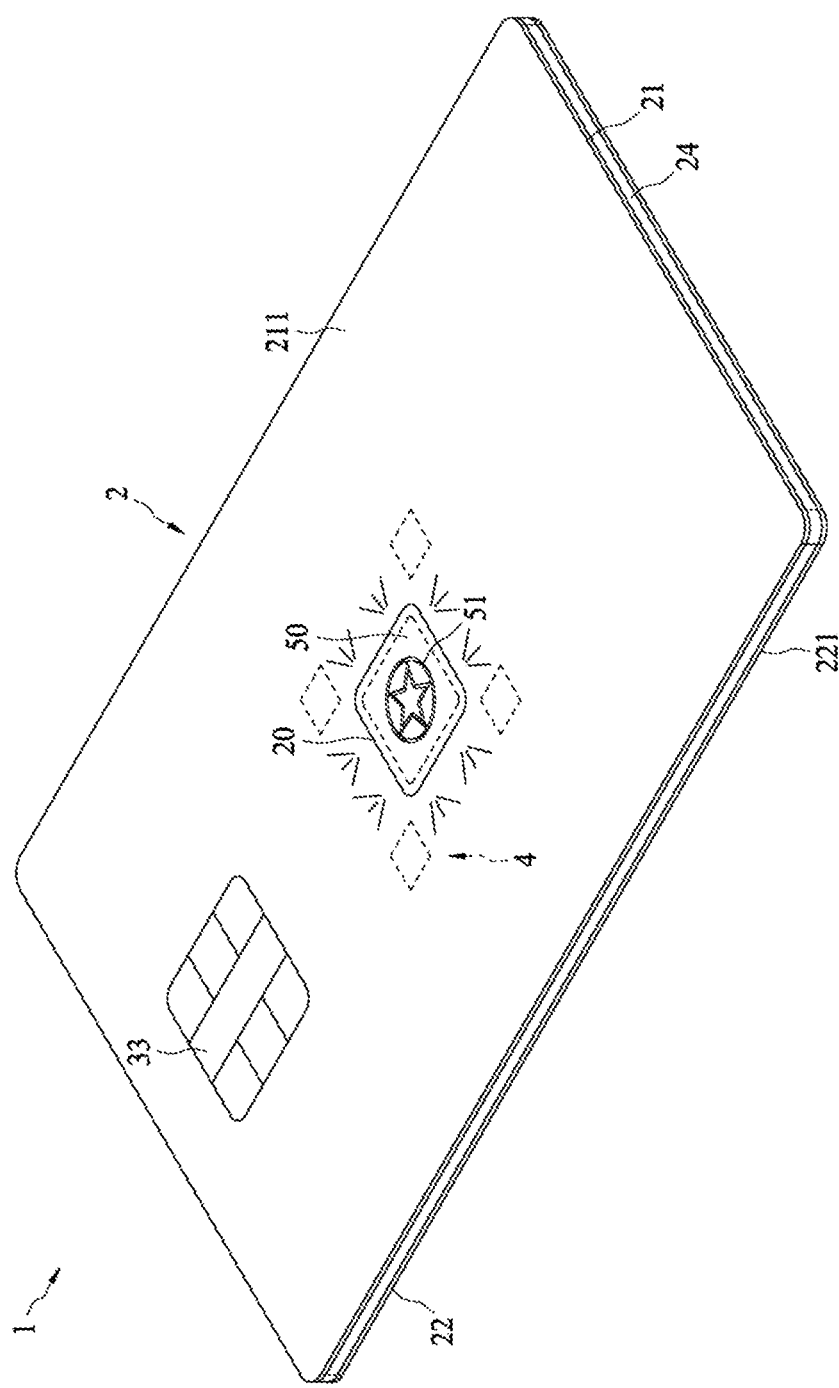
FIG. 1 and FIG. 2 are perspective schematic views of the light sculpture electronic card according to embodiments.

The following disclosure provides many different embodiments, or examples, for implementing different features of the provided subject matter. Specific examples of components and arrangements are described below to simplify the present disclosure. These are, of course, merely examples and are not intended to be limiting.

The electronic card can be applied in financial card, credit card, ATM card, stored value card, ticket card, membership card, commemorative card, IC card, ID card, etc. Because the electronic card is usually designed to easily carry, pick up and hold, its size should not designed too large. As a result, the electronic card usually does not have battery but is powered by an external device. Electronic cards can be classified into contact-type and contactless-type according to their power supply ways. Regarding the contact-type, a chip is exposed on the surface of the card to make electrical contact with the external device such as a card reader, so it can be used as a contact-type electronic card. For example, the electronic card is inserted into the card reader, and then the card reader contacts the chip of the electronic card to access (read/write/update) data on the chip of the electronic card. Regarding the contactless-type, a radio frequency antenna (or induction coil) is embedded within the card to react with the external device by sensing, so it can be used as a contactless-type electronic card. For example, the electronic card is close to the external device, and then the radio frequency antenna of the electronic card is wirelessly coupled to the external device. The external device supplies power to the electronic card through wireless coupling, and can access the radio frequency identification tag of the electronic card or access the data on the chip of the electronic card through radio frequency communication. The wireless coupling is, for example, mutual inductance coupling. The radio frequency identification tag is, for example, passive or semi-passive. Radio frequency communication is, for example, Near Field Communication (NFC). The electronic card can also be hybrid type, which has a chip used for contact-type and a radio frequency antenna used for contactless-type. It can be used as a contact-type or contactless-type electronic card depending on the actual situation. The function of the radio frequency communication chip can be integrated into the chip used for contact-type.

In some embodiments, the external device may power the electronic card to emit light. In some embodiments, the external device may power the electronic card to access data on the chip of the electronic card. In some embodiments, the external device may supply electric power to the electronic card to access data on the chip of the electronic card and also to power the electronic card to emit light simultaneously.

Regarding the size of the electronic card, for financial card, credit card, or cash card, the size is usually standardized according to ISO 7810, ISO 7816, and ISO/IEC 14443. It is generally 85.60 mm long, 53.98 mm wide and 0.76 mm thick. For other applications, the size of the electronic card will vary depending on the region. For example, in Taiwan, the general card size is 90 mm×54 mm; in the United Kingdom, France, Germany and other countries, the general card size is 85 mm×50.8 mm; in Canada and the United States, the general card size is 3.5×2 inches, approximately 88.9 mm×50.8 mm. Even if the size varies depending on the region or application or the designer's decision, the electronic card can usually be placed in wallet, purse or pocket, and its thickness is usually no more than 1 mm, normally about or less than 0.8 mm.

Figure 2:
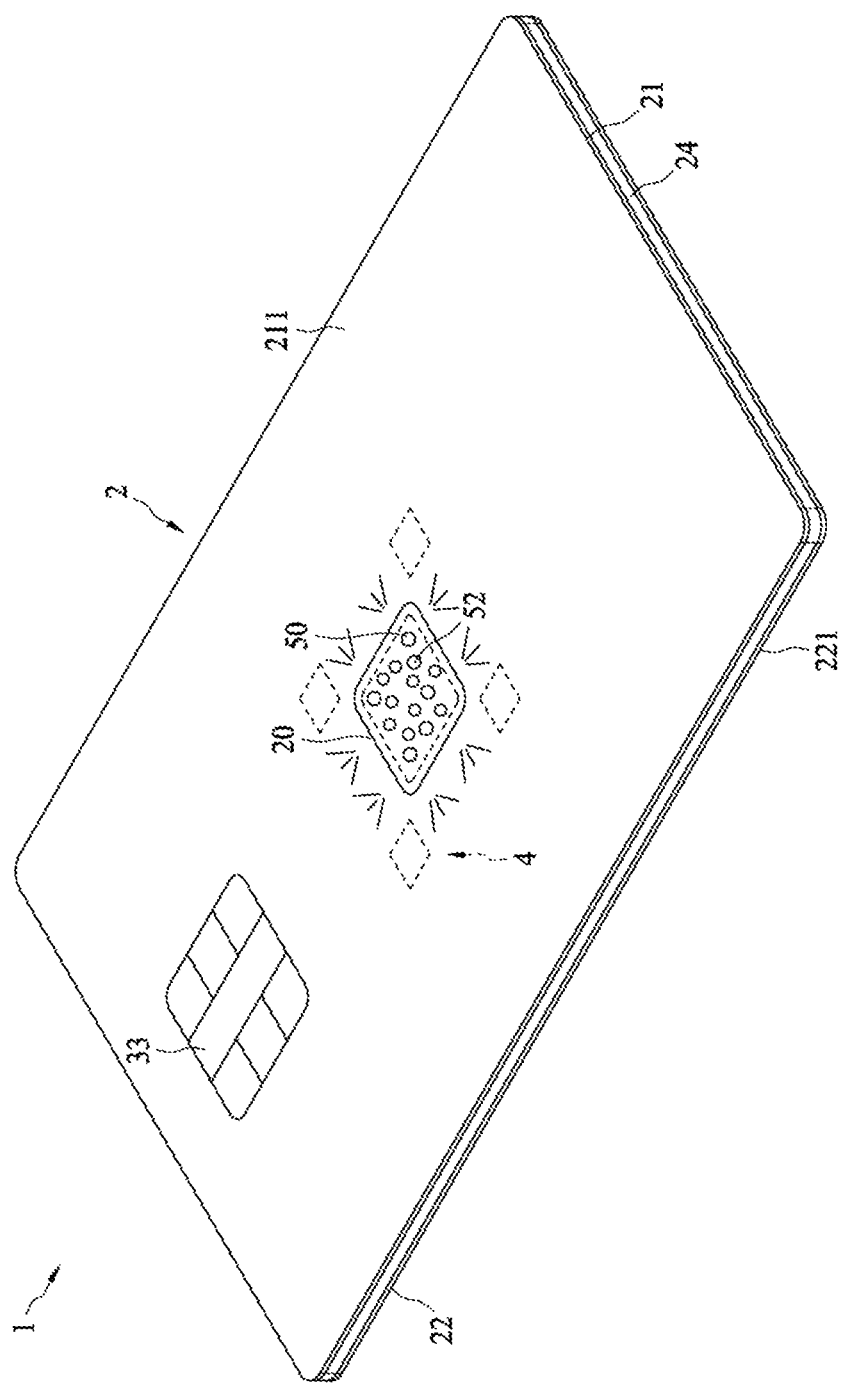
Figure 3:
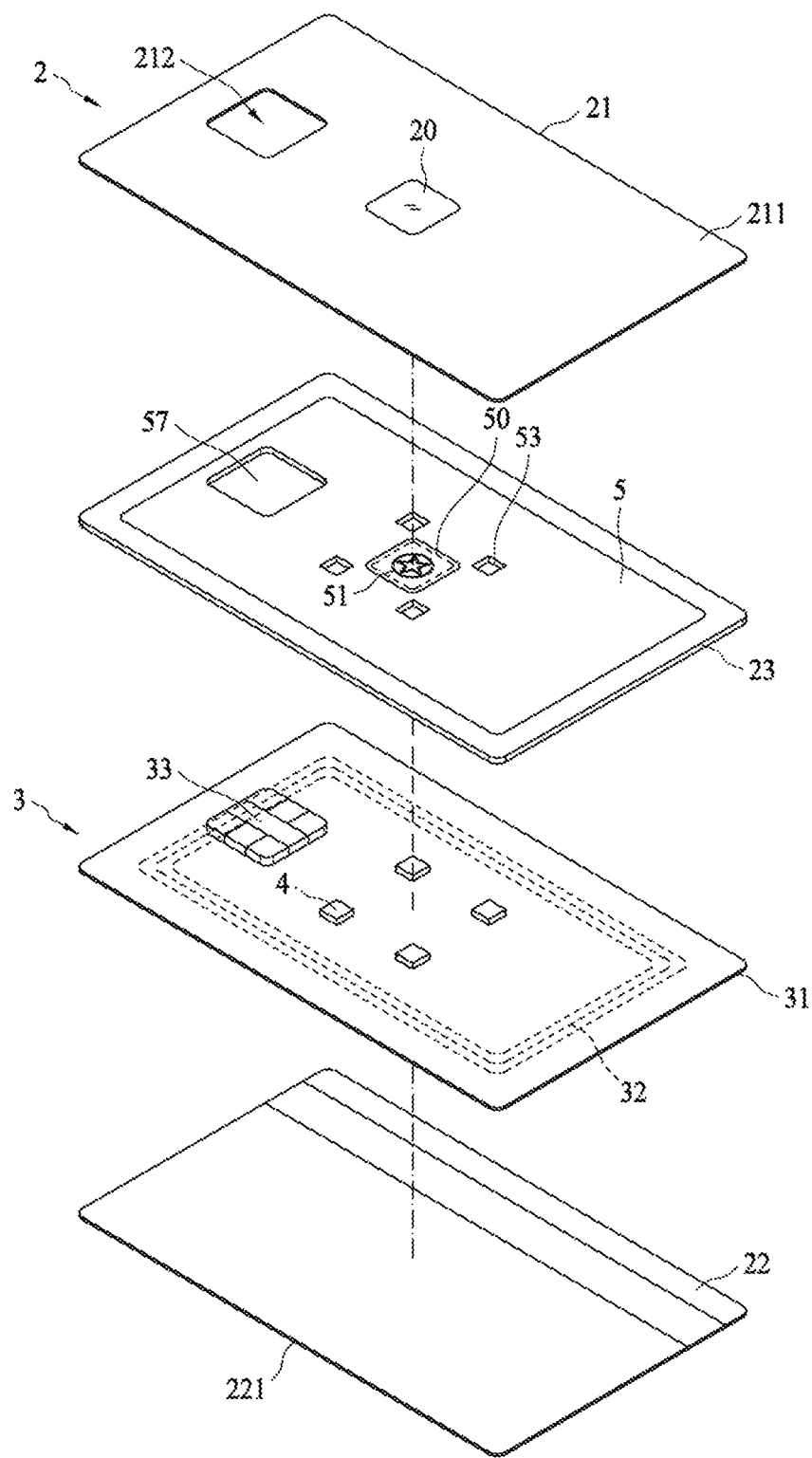
FIG. 3 is an exploded schematic view of the light sculpture electronic card according to embodiments.

FIG. 1 and FIG. 2 are perspective schematic views of the light sculpture electronic card 1 according to embodiments. FIG. 3 is an exploded schematic view of the light sculpture electronic card 1 according to the embodiments, for example, of FIG. 1. The light sculpture electronic card 1 includes a card body 2, and includes a circuit module 3 arranged in the card body 2, at least one light emitting element 4, and a light guiding plate 5. The circuit module 3 includes a circuit carrier board 31. The light emitting element 4 is coupled to the circuit carrier board 31. The card body 2 includes a light exiting area 20 which is externally visible. The light guiding plate 5 includes a light guiding plate body pattern 50 which may include a sculpture pattern 51 (as shown in FIG. 1) or a bubble area 52 (as shown in FIG. 2). The sculpture pattern 51 or the bubble area 52 of the light guiding plate body pattern 50 is aligned with the light exiting area 20 and therefore can be externally visible. The light guiding plate 5 guides the light emitted by the light emitting element 4 through the sculpture pattern 51 or the bubble area 52 of the light guiding plate body pattern 50 to the light exiting area 20, causing that the light having bright and dark variation, which is refracted and/or reflected by multiple interfaces within the sculpture pattern 51 or the bubble area 52, exits from the light exiting area 20.

The light guiding plate body pattern 50 is a pattern presented by the light guiding plate 5 itself, that is, the pattern which is presented by the light guiding plate 5 without additional physical elements attached to the light guiding plate 5. Regarding the sculpture pattern 51, for example, a sculpture or engraved mark may exist on the surface of the light guiding plate 5 to present this pattern. Regarding the bubble area 52, for example, there are a plurality of bubbles within the light guiding plate 5 to present bubbles or a bubble pattern. In addition, the sculpture or engraved mark on the surface of the light guiding plate 5 and the bubbles within the light guiding plate 5 are also helpful to guide the light from the light guiding plate 5 to the light exiting area 20.

Due to the limited power induced for activating the electronic card, it is not easy to increase the luminous visual effect of the electronic card by increasing the power. It results from that the standard card body of the electronic card is only about 0.8 mm thick causing that the light-emitting element within the card body must be very small. For a general contactless-type electronic card, the electrical power for emitting light is actually converted from the weak radio waves from the external device through the radio frequency antenna.

Because the light guiding plate 5 is provided directly with the light guiding plate body pattern which is externally visible (e.g. the sculpture pattern 51 or the bubble area 52), the light emitted by the light emitting element 4 which operates under limited power can be guided by the light guiding plate 5 to present visual effect such as a pattern or bubbles directly on the sculpture pattern 51 or the bubble area 52 of the light guiding plate body pattern on the light guiding plate 5, and they are externally visible for the user or other people through the light exiting area 20. Therefore, light energy can be used more efficiently to present visual effects. It is not necessary to attach an additional pattern element on or above the light guiding plate, but the electronic card still can present visual effects such as a pattern or bubbles. When the electronic card is accessing data or exchanging transaction data, it can also have the function of prompting.

The card body 2 includes a first board 21 and a second board 22. The light exiting area 20 is located at the first board 21. The circuit module 3, the light emitting element 4 and the light guiding plate 5 are located between the first board 21 and the second board 22. In some embodiments, the light exiting area 20 is an opening of the first board 21. The opening is not filled with material, or it can be filled with a light transmissive material, or it is covered by a light transmissive material. As a result, the sculpture pattern 51 or the bubble area 52 of the light guiding plate body pattern 50 is exposed on the first board 21 and thus visible. In another embodiments, the light exiting area 20 may be a light transmissive material which covers the sculpture pattern 51 or the bubble area 52 of the light guiding plate body pattern 50. As a result, the sculpture pattern 51 or the bubble area 52 of the light guiding plate body pattern 50 still can be visible through the light exiting area 20 on the first board 21.

The material of the card body 1 may include plastic, metal, or combination thereof. The plastic material may include ABS, PETG, PVC or PET, etc. The plastic material may be or include a light transmissive material or an opaque material. The metal material may be or include iron, aluminum, magnesium, copper, silver, gold, alloy, or combination thereof, etc. The metal material may be an opaque material. The first board 21 can be plastic, metal, or combination thereof. The second board 22 may be plastic, metal, or combination thereof. The first board 21 and the second board 22 may have same material, for example, they both having plastic material or both having metal material. The first board 21 and the second board 22 may have different materials, for example, one having a plastic material and the other having a metal material.

The material of the light guiding plate 5 may include PVC, PET, PC, or PMMA, etc. The light guiding plate 5 has at least one through hole 53 to accommodate the light emitting element 4. The light emitting element 4 can be a side view type LED and emits light toward the sculpture pattern 51 or the bubble area 52 of the light guiding plate body pattern 50. The light guiding plate 5 may be a thin plate or a thin membrane, and its thickness is, for example, less than 0.4 mm, or less than 0.2 mm, or less than 0.1 mm.

In some embodiments, the first board 21 and the second board 22 may be metal material, and the light exiting area 20 may be the opening of the first board 21. In some embodiments, the first board 21 and the second board 22 may be plastic material, the light exiting area 20 may be the light transmissive material of the first board 21, and other portion of the first board 21 and the second board 22 may be or include opaque material.

In some embodiments, the first board 21 and the second board 22 may respectively include a first light shielding part 211 and a second light shielding part 221. The first light shielding part 211 does not shield the light exiting area 20. The circuit module 3, the light emitting element 4 and the light guiding plate 5 are assembled between the first light shielding part 211 and the second light shielding part 221. The first light shielding part 211 and the second light shielding part 221 are capable of shielding light, and they can be light shielding ink or they can be the surfaces of the metal materials of the first board 21 and the second board 22. It is helpful for the light guiding plate 5 to guide the light emitted by the light emitting element 4 to the sculpture pattern 51 or the bubble area 52 of the light guiding plate body pattern 50 through the first light shielding part 211 and the second light shielding part 221.

Besides, the first light shielding part 211 and the second light shielding part 221 can be a full surface of opaque light shielding layer. But the first light shielding part 211 is not arranged at the light exiting area 20 so that the light exiting area 20 is not shielded by the first light shielding part 211. Moreover, an additional required pattern can be added on the surfaces of the first light shielding part 211 and the second light shielding part 221 in order to make the electronic card 1 satisfy actual needs.

The circuit module 3 includes a contactless-type RF antenna 32 and/or a contact-type accessing chip 33. The electronic card may be hybrid type, the contactless-type RF antenna 32 is arranged at the circuit carrier board 31, and the contact-type accessing chip 33 is arranged at the circuit carrier board 31. The circuit carrier board 31 may be light transmissive material or opaque material. In some embodiments, the electronic card may be contactless-type and it may not have the contact-type accessing chip 33, but a chip is still arranged at the circuit carrier board 31 within the card and coupled to the contactless-type RF antenna 32. In some embodiments, the electronic card is contact-type and it may not have the contactless-type RF antenna 32. In the case that the contact-type accessing chip 33 exists, the first board 21 and the light guiding plate 5 may have openings 212, 57 aligned with the contact-type accessing chip 33, so that the contact-type accessing chip 33 is exposed and arranged on the card body 2.

For example, the number of the light emitting elements 4 is four. The light guiding plate 5 includes at least same number of through holes 53 as the light emitting elements 4. For example, it has at least four through holes 53 to respectively accommodate four light emitting elements 4. The four light emitting elements 4 are side view type LEDs, emit light toward the light guiding plate body pattern 50, and are arranged in rectangle near the light guiding plate body pattern 50.

In some embodiments, the card body 2 includes a frame 24 to accommodate the circuit module 3 and the light guiding plate 5 in the frame 24. The frame 24 is sandwiched between the first board 21 and the second board 22. The frame 24 may be opaque or have a light shielding element, so as to prevent the light emitted by the light emitting element 4 from leaking out of the frame 24. In some embodiments, the edge of the first board 21 or the second board 22 may be formed with the frame. For example, the whole of the frame 24 or a part of the frame 24 may be integrated formed with the first board 21, or the whole of the frame 24 or a part of the frame 24 may be integrated formed with the second board 22. The first board 21 and the second board 22 are combined through the frame 24 to form an accommodation space within the card body 2 where the circuit carrier board 31 of the circuit module 3 and the light guiding plate 5 are arranged. In some embodiments, the card body 2 may not include the frame 24. In this case, the lateral edge of the light guiding plate 5 may be taken as the lateral edge of the electronic card 1. The lateral edge of the light guiding plate 5 may be opaque or have a light shielding element to prevent the light emitted by the light emitting element 4 from leaking out of the lateral edge. The lateral edge of the circuit carrier board 31 may also be taken as the lateral edge of the electronic card 1. The lateral edge of the circuit carrier board 31 may be opaque or have a light shielding element to prevent the light emitted by the light emitting element 4 from leaking out of the lateral edge. In some embodiments, the edge of the light guiding plate 5 may be formed with the frame. For example, the whole of the frame or a part of the frame may be integrated formed with the light guiding plate 5. The circuit carrier board 31 of the circuit module 3 is arranged in the frame of the light guiding plate 5. The frame of the light guiding plate 5 can extend downward to accommodate the outer side of the circuit carrier board 31 on the inner side of the frame.

Although FIG. 3 is drawn based on the electronic card 1 of FIG. 1, the elements and their descriptions in FIG. 3 are also applicable to the electronic card 1 of FIG. 2. In addition, the electronic card shown in FIGS. 1-3 may be an electronic card that emits light from one side, or may be an electronic card that emits light from both sides as shown in FIG. 4.

Figure 4:
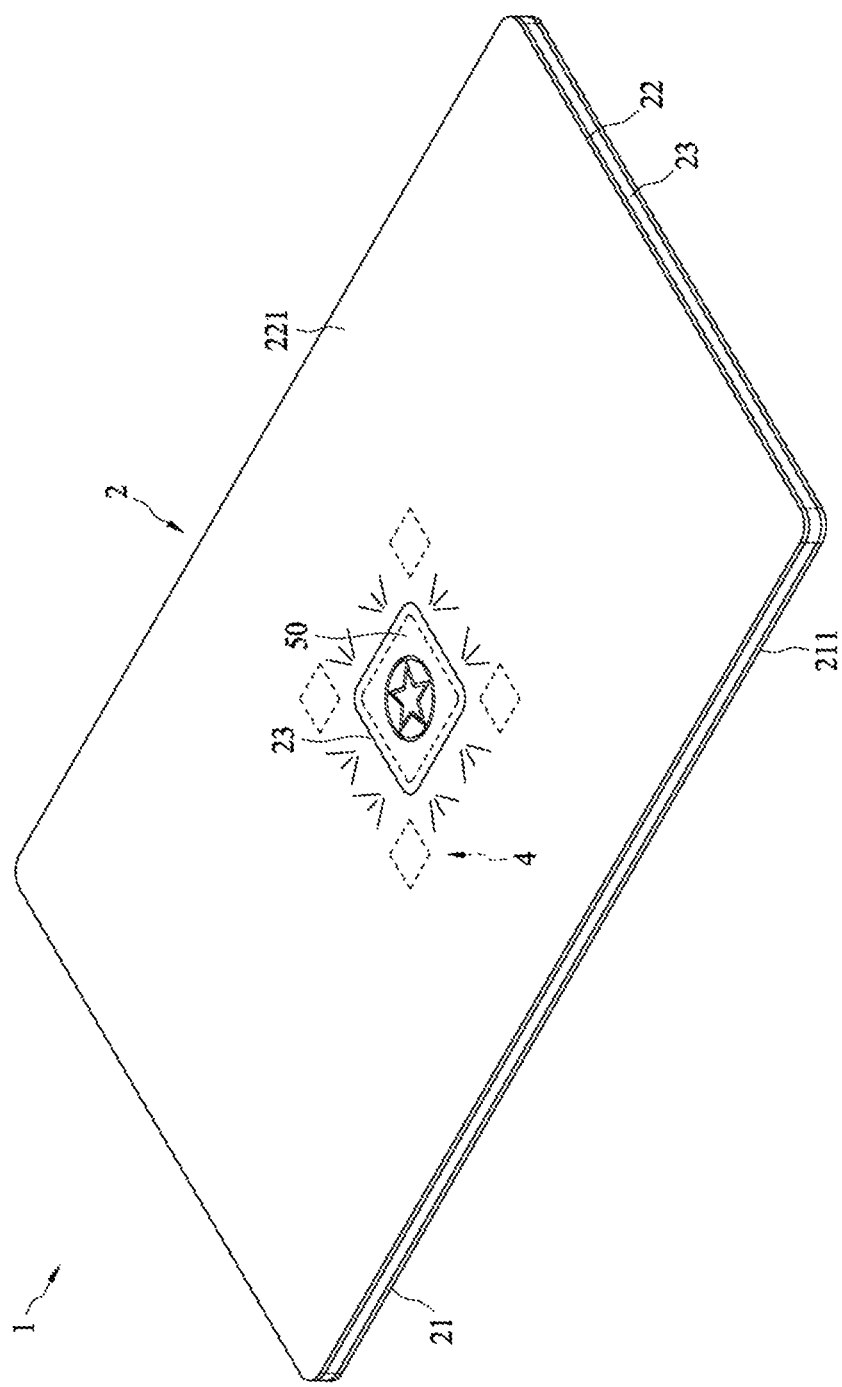
FIG. 4 is a perspective schematic view of the light sculpture electronic card according to embodiments.

FIG. 4 is a perspective schematic view of the light sculpture electronic card 1 according to embodiments. The card body 2 may include another light exiting area 23, which is located at the second board 22 and aligned with the light exiting area 20 on the first board 21. The sculpture pattern 51 or the bubble area 52 of the light guiding plate body pattern 50 is aligned with the light exiting area 23, and therefore it is externally visible through the light exiting area 23. The light guiding plate 5 guides the light emitted by the light emitting element 4 through the sculpture pattern 51 or the bubble area 52 of the light guiding plate body pattern 50 to the light exiting area 20 and light exiting area 23, causing the light to exit from the light exiting area 20 and light exiting area 23. The sculpture pattern 51 or the bubble area 52 of the light guiding plate body pattern 50 may present visual effect such as a pattern or bubbles on both sides of the electronic card 1.

In some embodiments, regarding the electronic card that emits light from one side, the contact-type accessing chip 33 and the light exiting area 20 can be arranged at the same side of the electronic card 1. In some embodiments, regarding the electronic card that emits light from one side, the contact-type accessing chip 33 and the light exiting area 20 can be arranged at two sides of the electronic card 1.

Figure 5A:
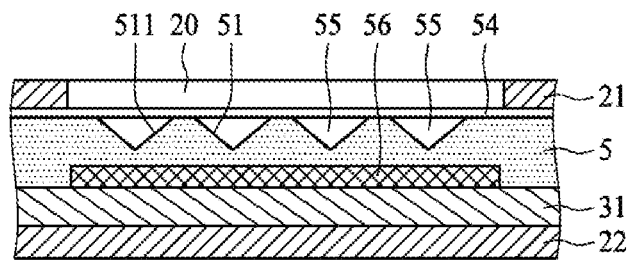
FIGS. 5A to 5C are sectional schematic views of the light sculpture electronic card according to embodiments.
Figure 5B:
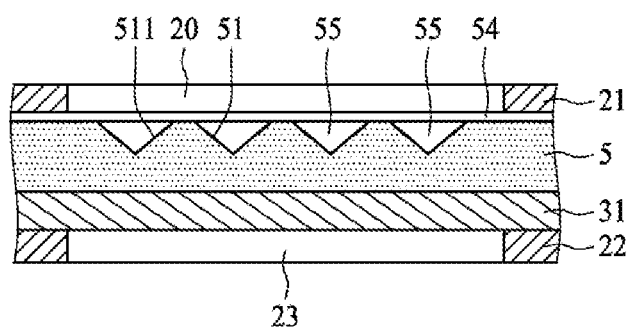
Figure 5C:
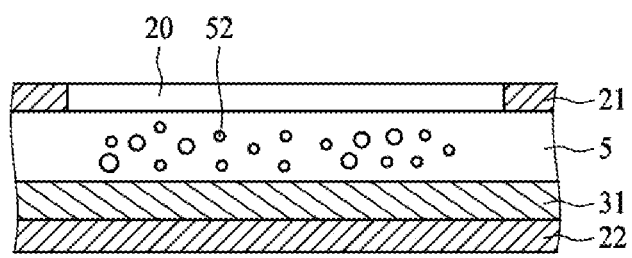

FIGS. 5A-5C are sectional schematic views of the light sculpture electronic card according to embodiments. In FIGS. 5A and 5B, the sculpture pattern 51 is located at the surface of the light guiding plate 5 and includes at least one groove 511. In some embodiments, the shape of the groove 511 is V-shaped or U-shaped. The opening of the groove 511 is toward the light exiting area 20. The groove 511 is covered by a horizontal membrane 54 to form a cavity 55 between the groove 51 and the horizontal membrane 54. There can be air left in the cavity 55. The light emitted by the light emitting element 4 can be emitted through the cavity 55 to the light exiting area 20 after being refracted by the groove 511 in the light guiding plate 5. The horizontal membrane 54 may cover the entire surface of the light guiding plate 5, or may only cover the sculpture pattern 51.

The groove 511 is the sculpture or engraving mark on the surface of the light guiding plate 5 to present the sculpture pattern 51. The groove 511 may be formed by laser engraving, knife engraving, or molding. The sculpture pattern 51 is usually composed of a plurality of line segments. For example, these line segments are contour lines, or texture lines, or representation lines of the pattern, etc. The groove 511 is formed on the surface of the light guiding plate 5 according to these line segments.

The horizontal membrane 54 may be attached to the sculpture pattern 51, for example, by adhesion or adjoining. The horizontal membrane 54 and the cavity 55 are arranged to prevent the first board 21 of the card body 2 from sinking into the groove 511 during the manufacturing process. The cavity 55 allows the groove 511 to emit light more efficiently to the light exiting area 20. The groove 511 and the cavity 55 are helpful to guide the light from the light guiding plate 5 to the light exiting area 20. Generally speaking, in the manufacturing process of the electronic card, it is usually not desirable to produce a sculpture or engraving mark or cavities in or on the card body 2 or the light guiding plate 5 because the sculpture or engraving mark or cavities are considered defects during the manufacturing process. The Electronic card having sculpture or engraving mark or cavities are generally considered defective. But in this disclosure, sculpture or engraving mark or cavities that are usually considered defects are otherwise utilized with their optical properties to present a pattern and their visual effects.

In some embodiments, for example, the electronic card shown in FIG. 5A emits light from one side, and the electronic card shown in FIG. 5B emits light from both sides. In FIG. 5B, the light exiting area 20 and the light area 23 are located at the two sides of the light guiding plate 5. The sculpture pattern 51 with its groove 511 and the cavity 55 are located between and aligned with the light exiting area 20 and the light area 23. Further, on another side of the light guiding plate 5 (e.g. on the lower surface shown in the figure), another groove, another horizontal membrane and another cavity (not shown in the figure) can be provided. The pattern represented by another groove can correspond to or match with the pattern presented by the groove 511. For example, they are symmetrical with respect to the light guiding plate 5.

In FIG. 5C, the bubble area 52 includes a plurality of bubbles within the light guiding plate 5. The bubbles can be generated randomly or deliberately, and the bubbles can also be arranged randomly or deliberately into a specified pattern. The bubbles are also helpful to guide the light from the light guiding plate 5 to the light exiting area 20. Generally speaking, in the manufacturing process of the electronic card, it is usually not desirable to produce bubbles in the card body 2 or the light guiding plate 5 because the bubbles are considered defects during the manufacturing process. The Electronic card having bubbles is generally considered defective. But, in this disclosure, the bubbles that are usually considered defects are otherwise utilized with their optical properties to present their visual effects.

In some embodiments, for example, the electronic card shown in FIG. 5C emits light from one side. If the electronic card in FIG. 5C is changed to the electronic card that emits light from both sides, the light exiting area 20 and the light area 23 can be located at the two sides of the light guiding plate 5 as shown in FIG. 5B. The bubble area 52 is located between and aligned with the light exiting area 20 and the light area 23.

Further, in FIGS. 5A and 5C, an ink layer 56 is on the light guiding plate 5. The ink layer 56 and the light exiting area 20 are respectively located on two sides of the light guiding plate 5. The ink layer 56 is aligned with the sculpture pattern 51 or the bubble area 52 of the light guiding plate body pattern 50. The ink layer 56 may include luminous ink or photosensitive ink. With the shielding of the first light shielding part 211 and the second light shielding part 221, the light guiding plate 5 is enhanced to guide the light emitted by the light emitting element 4 within it. With the ink layer 56, the amount of the light reflection to the light exiting area 20 and the sculpture pattern 51 or the bubble area 52 of the light guiding plate body pattern 50 is also increased, thereby enhancing the amount of output light and visual effects. Further, in some embodiments, the light guiding plate 5 does not need to be provided with the ink layer 56.

Figure 6:
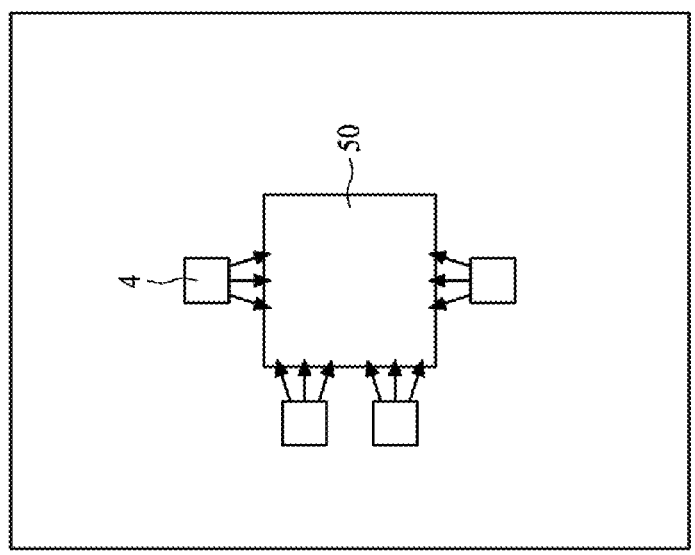
FIG. 6 is an arrangement schematic view of the light emitting element of the light sculpture electronic card according to embodiments.

FIG. 6 is an arrangement schematic view of the light emitting elements of the light sculpture electronic card according to embodiments. For example, the number of the light emitting elements 4 is four. The light guiding plate at least includes same number of through holes as the light emitting element 4. For example, it has at least four through holes to respectively accommodate four light emitting elements. The four light emitting elements are side view type LEDs and arranged along the edge of the light guiding plate body pattern 50.

Besides, in some embodiments, the card body of the electronic card may include a plurality of light exiting areas on the same side of the electronic card, for example, all on the upper surface of the electronic card shown in the above figures. In some embodiments, the card body of the electronic card may include a plurality of light exiting areas on different sides of the electronic card, for example, on the upper and lower surfaces of electronic card shown in the above figures. The light guiding plate of the electronic card may include a plurality of light guiding plate body patterns. These light guiding plate body patterns may be respectively aligned with a plurality of light exiting areas. These light guiding plate body patterns may all be sculpture pattern; or these light guiding plate body patterns may all be bubble areas, and the bubble areas include a plurality of bubbles located within the light guiding plate; or one of these light guiding plate body patterns is a sculpture pattern, and another one is a bubble area which includes a plurality of bubbles located within the light guiding plate.

Moreover, in some embodiments, the edge of the card body, the light guiding plate or the circuit carrier board of the electronic card may be opaque or have a light shielding element in order to prevent the light emitted by the light emitting element from leaking out of the edge of the electronic card.

Further, in some embodiments, the edge of the card body, the light guiding plate or the circuit carrier board of the electronic card may be light transmissive so that the light emitted by the light emitting element can exit from the edge of the electronic card to achieve another visual effect. For example, while the sculpture pattern 51 or the bubble area 52 of the light guiding plate body pattern with emitting light presents visual effects such as a pattern or bubbles, the edge of the card also emits light to accompany the sculpture pattern 51 or the bubble area 52.

The foregoing contents present several embodiments or exemplary examples so that those with ordinary skill in the art can better understand various aspects of the present disclosure. Those with ordinary skill in the art should realize that the present disclosure may be utilized as a basis for designing or modifying other processes and structures for carrying out the same purposes and/or achieving the same advantages of the embodiments or exemplary examples herein. Those of ordinary skill in the art should also recognize that such equivalent constructions do not depart from the spirit and scope of the disclosure, and that various changes, substitutions, and alterations may be made herein without departing from the spirit and scope of the disclosure.

The invention claimed is:

1. A light sculpture electronic card, comprising:
    a card body, comprising at least one light exiting area;
    a circuit module, arranged in the card body, and comprising a circuit carrier board;
    at least one light emitting element, arranged in the card body and coupled to the circuit carrier board; and
    a light guiding plate, arranged in the card body and comprising at least one light guiding plate body pattern, wherein the light guiding plate body pattern is aligned with the light exiting area, the light guiding plate guides the light emitted by the light emitting element through the light guiding plate body pattern to and out from the light exiting area.

2. The light sculpture electronic card of claim 1, wherein the light guiding plate body pattern comprising:
    a sculpture pattern.

3. The light sculpture electronic card of claim 2, wherein the sculpture pattern is located at the surface of the light guiding plate and comprises:
    at least one groove, covered by a horizontal membrane to form a cavity between the groove and the horizontal membrane.

4. The light sculpture electronic card of claim 1, wherein the light guiding plate body pattern comprising:
    a plurality of bubbles, located within the light guiding plate.

5. The light sculpture electronic card of claim 1, wherein the card body comprises:
    a first board and a second board, wherein the light exiting area is located at the first board,
    wherein the circuit module, the light emitting element and the light guiding plate are disposed between the first board and the second board.

6. The light sculpture electronic card of claim 5, wherein the card body comprises:
    another light exiting area, located at the second board and aligned with the light exiting area located at the first board.

7. The light sculpture electronic card of claim 5,
    wherein the first board and the second board respectively comprises a first light shielding part and a second light shielding part, and the first light shielding part does not shield the light exiting area,
    wherein the circuit module, the light emitting element and the light guiding plate are disposed between the first light shielding part and the second light shielding part.

8. The light sculpture electronic card of claim 1,
    wherein an ink layer and the light exiting area are located at two sides of the light guiding plate,
    wherein the ink layer is aligned with the light guiding plate body pattern, and
    wherein the ink layer comprises luminous ink or photosensitive ink.

9. The light sculpture electronic card of claim 1, wherein the light exiting area is an opening.

10. The light sculpture electronic card of claim 1, wherein the light exiting area is a light transmissive material.

11. The light sculpture electronic card of claim 1, wherein the material of the card body comprises plastic.

12. The light sculpture electronic card of claim 1, wherein the material of the card body comprises metal, or a combination of metal and plastic.

13. The light sculpture electronic card of claim 1, wherein the material of the light guiding plate comprises PVC, PET, PC or PMMA.

14. The light sculpture electronic card of claim 1, wherein the light guiding plate has at least one through hole to accommodate the light emitting element, and the light emitting element is a side view type LED and emits light toward the light guiding plate body pattern.

15. The light sculpture electronic card of claim 1, wherein the light guiding plate has four through holes to respectively accommodate four light emitting elements, and the light emitting elements are side view type LEDs and emit light toward the light guiding plate body pattern.

16. The light sculpture electronic card of claim 1,
    wherein the circuit module comprises a contactless-type RF antenna and/or a contact-type accessing chip,
    wherein the contactless-type RF antenna is arranged at the circuit carrier board and/or the contact-type accessing chip is arranged at the circuit carrier board.

17. A light sculpture electronic card, comprising:
    a card body, comprising at least one light exiting area, a first board and a second board, wherein the light exiting area is a light transmissive material located at the first board;
    a circuit module, arranged in the card body, and comprising a circuit carrier board;

at least one light emitting element, arranged in the card body and coupled to the circuit carrier board; and a light guiding plate, arranged in the card body and comprising at least one light guiding plate body pattern, wherein the light guiding plate body pattern comprises a sculpture pattern aligned with the light exiting area, the light guiding plate guides the light emitted by the light emitting element through the sculpture pattern to and out from the light exiting area, wherein the sculpture pattern is located at the surface of the light guiding plate and comprises at least one groove which is covered by a horizontal membrane to form a cavity between the groove and the horizontal membrane, wherein the circuit module, the light emitting element and the light guiding plate are disposed between the first board and the second board.

18. The light sculpture electronic card of claim 17, wherein the card body comprises:

another light exiting area, located at the second board and aligned with the light exiting area located at the first board.

19. The light sculpture electronic card of claim 17, wherein an ink layer and the light exiting area are located at two sides of the light guiding plate, wherein the ink layer is aligned with the light guiding plate body pattern, and wherein the ink layer comprises luminous ink or photo-sensitive ink.

20. The light sculpture electronic card of claim 19, wherein the light guiding plate has at least one through hole to accommodate the light emitting element, and the light emitting element is a side view type LED and emits light toward the light guiding plate body pattern, wherein the material of the card body comprises plastic, metal, or a combination thereof, wherein the material of the light guiding plate comprises PVC, PET, PC or PMMA, wherein the circuit module comprises a contactless-type RF antenna and/or a contact-type accessing chip, wherein the contactless-type RF antenna is arranged at the circuit carrier board and/or the contact-type accessing chip is arranged at the circuit carrier board, wherein the first board and the second board respectively comprises a first light shielding part and a second light shielding part, and the first light shielding part does not shield the light exiting area, wherein the circuit module, the light emitting element and the light guiding plate are disposed between the first light shielding part and the second light shielding part.

* * * * *